US012517262B2

(12) United States Patent
Cheng

(10) Patent No.: US 12,517,262 B2
(45) Date of Patent: Jan. 6, 2026

(54) DEMODULATING BEIDOU GNSS SIGNALS

(71) Applicant: u-blox AG, Thalwil (CH)

(72) Inventor: Zhenlan Cheng, Thalwil (CH)

(73) Assignee: u-blox AG, Thalwil (CH)

( * ) Notice: Subject to any disclaimer, the term of this patent is extended or adjusted under 35 U.S.C. 154(b) by 400 days.

(21) Appl. No.: 18/074,896

(22) Filed: Dec. 5, 2022

(65) Prior Publication Data

US 2023/0176231 A1 Jun. 8, 2023

(30) Foreign Application Priority Data

Dec. 7, 2021 (EP) .................................... 21212961

(51) Int. Cl.
*G01S 19/24* (2010.01)

(52) U.S. Cl.
CPC .................................... *G01S 19/24* (2013.01)

(58) Field of Classification Search
None
See application file for complete search history.

(56) References Cited

U.S. PATENT DOCUMENTS

2017/0102465 A1 4/2017 Yu et al.
2023/0152472 A1* 5/2023 Wang .................... G01S 19/43 342/357.23

OTHER PUBLICATIONS

Extended Search Report in European Appln. No. 21212961.3, dated May 23, 2022, 9 pages.
Gao et al., "Design and implementation of a real-time software receiver for BDS-3 signals," Navigation, 2019, 66(1):83-97.
Lu et al., "Decoding PPP corrections from BDS B2b signals using a software-defined receiver: an initial performance evaluation," IEEE Sensors Journal, 2020, 21(6):7871-7883.

* cited by examiner

*Primary Examiner* — Whitney Moore
(74) *Attorney, Agent, or Firm* — Fish & Richardson P.C.

(57) ABSTRACT

A method and apparatus are provided for demodulating a B2b signal from a satellite in the BeiDou Navigation Satellite System. The method comprises tracking a first signal transmitted in a first GNSS operational band by the satellite, to estimate one or more parameters of the first signal; predicting, based on the estimated one or more parameters of the first signal, one or more parameters of the B2b signal transmitted by the satellite; and demodulating the B2b signal to obtain data bits of a data message modulated on the B2b signal by the satellite. The demodulating is based on the one or more predicted parameters of the B2b signal.

9 Claims, 2 Drawing Sheets

DEMODULATING BEIDOU GNSS SIGNALS

CROSS-REFERENCE TO RELATED APPLICATIONS

This application claims the benefit of priority to European Application No. 21212961.3, filed on Dec. 7, 2021, the contents of which are hereby incorporated by reference.

FIELD OF THE INVENTION

The present invention relates to Global Navigation Satellite Systems (GNSS). In particular, it relates to a method for demodulating GNSS signals from a satellite of the BeiDou Navigation Satellite System, and a GNSS receiver configured to demodulate such GNSS signals.

BACKGROUND OF THE INVENTION

Techniques for GNSS positioning are well known in the art. Existing GNSS include the Global Positioning System (GPS), Galileo, GLONASS, and BeiDou. Each GNSS comprises a constellation of satellites, also known in the art as "space vehicles" (SVs), which orbit the earth. Typically, each SV transmits a number of signals. These are received by a receiver whose position it is desired to calculate. The receiver can make a number of ranging measurements using the signals, to derive information about the distance between the receiver and respective satellites. When a sufficient number of measurements can be made, the receiver's position can then be calculated by multilateration.

In addition to the signals transmitted for ranging purposes (on which data in the form of a navigation message may be modulated), the SVs may transmit one or more data signals. These are not intended to be used directly for ranging measurements. Instead, they may be used to provide data messages, which may support one or more purposes. One possible purpose is to provide a satellite-based augmentation system (SBAS). The aim of such an augmentation system is to improve the integrity, assurance, accuracy, reliability, and/or availability of the GNSS, by incorporating additional external information into the positioning calculations. An SBAS uses ground infrastructure to measure signals from the SVs. Based on these measurements, corrections are calculated, which compensate for sources of error (including effects such as clock drift and ionospheric delay, for example). The corrections are transmitted to the SVs, and broadcast by the SVs as messages in the one or more data signals. In this way, the SVs can transmit correction data that allows a receiver to correct ranging measurements that it makes based on the ranging signal(s) of that satellite. An SBAS typically operates at a regional or continental scale.

Other data signals may be provided for other purposes. For example, encrypted authentication signals may be provided, which make it possible to authenticate the ranging signals. This can allow a receiver to confirm that the GNSS signals it receives are authentic SV signals, rather than potentially spoofed signals.

The BeiDou Navigation Satellite System (BDS), also referred to herein as simply "BeiDou", is a Chinese GNSS. It provides precise point positioning (PPP) corrections in a data signal transmitted in the B2b band (centred at 1207.14 MHz).

SUMMARY OF THE INVENTION

It would be desirable to demodulate GNSS data signals as efficiently and accurately as possible, so that a GNSS receiver can best make use of the services supported by these signals.

According to one aspect, there is provided a method for demodulating a B2b signal from a satellite in the BeiDou Global Navigation Satellite System, hereinafter GNSS, the method comprising:

tracking a first signal transmitted in a first GNSS operational band by the satellite, to estimate one or more parameters of the first signal;

predicting, based on the estimated one or more parameters of the first signal, one or more parameters of the B2b signal transmitted by the satellite; and demodulating the B2b signal to obtain data bits of a data message modulated on the B2b signal by the satellite, wherein the demodulating is based on the one or more predicted parameters of the B2b signal.

This method can allow more reliable bit detection (demodulation) of the data signals in the B2b band—in particular, through improved tracking of the parameters of the B2b signal. It uses another signal transmitted by the same satellite as a pilot signal.

Conventionally, tracking the B2b signal relied on accurate bit detection. Meanwhile, accurate bit detection relied on accurate carrier tracking. This meant that incorrect bit detection could give rise to an error in Doppler frequency estimation, leading to frequency locked loop (FLL) divergence. This, in turn, could give rise to worse performance in bit detection. These problems arise at least in part because the B2b signal does not include any (publicly available) pilot signal.

Examples according to the present disclosure can avoid these problems, by eliminating the need to separately track the B2b signal, and instead using the first signal as a pilot.

The data bits may be data bits of a predetermined dwell time. The dwell time may be defined as a coherent integration length over which samples of the B2b signal are summed, during the demodulation.

Predicting the one or more parameters of the B2b signal may in some cases be based solely on the estimated one or more parameters of the first signal. In other cases it may be based in part on the estimated one or more parameters of the first signal, and in part on other parameters, such as an estimate of a difference between the parameters of the two signals. Demodulating the B2b signal may be based solely on the one or more predicted parameters of the B2b signal. In particular, the method can demodulate the B2b signal without the use of a completely separate tracking loop for tracking the B2b signal, since the B2b signal can be demodulated based (at least in part) on tracking parameters of the first signal.

The method may further comprise (in particular, before tracking the first signal) receiving the first signal and the B2b signal. The signals may be received via an antenna by an RF front-end (as summarised later, below).

Optionally: the one or more parameters of the first signal comprise a code phase of the first signal; the one or more parameters of the B2b signal comprise a code phase of the B2b signal; and the method comprises predicting, based on the estimated code phase of the first signal, the code phase of the B2b signal.

Predicting the code phase of the B2b signal may comprise adding or subtracting an offset to or from the estimated code phase of the first signal.

In general, the offset may be positive or negative. It should be understood that subtracting a positive offset is equivalent to adding a negative offset, and subtracting a negative offset is equivalent to adding a positive offset.

The code phase of the B2b signal may be predicted based solely on the estimated code phase of the first signal and the offset.

The method may further comprise estimating a group delay difference between the first signal and the B2b signal, wherein the offset comprises or consists of the estimated group delay difference.

Estimating the group delay difference may be based on the data bits obtained by demodulating the B2b signal. In particular, the method may comprise: wiping off the data bits from the B2b signal, within the predetermined dwell time, to produce a residual carrier signal; and integrating (that is, summing) the samples of the residual carrier signal over the predetermined dwell time. Wiping off the data bits may comprise multiplying the B2b signal by a signal representing the data bits. These steps may be performed on the B2b signal after a spreading code has been wiped off the B2b signal. The steps may be repeated for multiple phases of the spreading code—in particular, it may be repeated for early, prompt, and late phases of the spreading code.

The method may further comprise, before estimating the group delay difference: wiping off the obtained data bits from the B2b signal; and after wiping off the data bits, integrating samples of the B2b signal over a predetermined dwell, wherein the group delay difference is estimated based on a result of the integrating.

Integrating signal samples in this way may help to make the estimation of the group delay difference more reliable. The predetermined dwell may correspond to a combined duration of the data bits that were wiped off. The samples of the B2b signal may be coherently integrated over this entire duration.

Optionally: the one or more parameters of the first signal comprise a frequency of the first signal; the one or more parameters of the B2b signal comprise a frequency of the B2b signal; and the method comprises predicting, based on the estimated frequency of the first signal, the frequency of the B2b signal. The frequency may comprise or consist of a Doppler frequency, for example. The frequency of the B2b signal may be predicted based solely on the estimated frequency of the first signal. Here, it should be understood that the estimated and predicted frequencies relate to the carrier frequencies of the respective signals.

Predicting the frequency of the B2b signal may comprise scaling the estimated frequency of the first signal by a predetermined scale factor. The scale factor may be defined by the ratio between a nominal carrier frequency of the first signal and a nominal carrier frequency of the B2b signal.

The first GNSS operational band may be one of: BeiDou B2a band; BeiDou B3 band; BeiDou B1C band; and BeiDou B1I band. Of these bands for the first signal, the B2a band may be the most preferred, since the B2a band (at 1176.45 MHz) is the closest in frequency to the B2b band (at 1207.14 MHz). The B3 band (1268.52 MHz) is slightly further in frequency from the B2b band; while the B1I band (1561.098 MHz) and the B1C band (1575.42 MHz) are still further spaced in frequency from the B2b band. In general, the smaller the frequency spacing, the better the correlation between the group delay experienced by the respective signals. In other words, the B2a signal is most likely to experience a similar group delay to the B2b signal, and the group delay difference between these signals is likely to be the most stable.

The method may further comprise: tracking a second signal transmitted in a second GNSS operational band by a second satellite, to estimate one or more parameters of the second signal; predicting, based on the estimated one or more parameters of the second signal, one or more parameters of a B2b signal transmitted by the second satellite; and demodulating said B2b signal to obtain data bits of a data message modulated on said B2b signal by the second satellite, wherein the demodulating is based on the one or more predicted parameters of the B2b signal.

In this way, the method can apply aiding to demodulate the B2b data message of multiple satellites. The B2b signal of each satellite is demodulated based on the estimated parameters of another signal transmitted by that same satellite in a different frequency band. The tracking, predicting, and demodulating in relation to the signals of the second satellite are preferably performed concurrently with the tracking, predicting, and demodulating in relation to the signals of the first satellite. The second GNSS operational band may be the same band as the first GNSS operational band or may be a different band. The second GNSS operational band may be one of: BeiDou B2a band; BeiDou B3 band; BeiDou B1C band; and BeiDou B1I band.

Also provided is a computer program comprising computer program code configured to cause one or more physical computing devices to perform all the steps of a method as summarized above, when said computer program is run on said one or more physical computing devices.

The computer program may be stored on a computer readable storage medium (optionally non-transitory). The one or more physical computing devices may comprise or consist of one or more processors of a GNSS receiver.

Also provided is a Global Navigation Satellite System receiver, hereinafter GNSS receiver, comprising:

- at least one tracking loop, configured to track a first signal transmitted in a first GNSS operational band by a satellite in the BeiDou GNSS, to estimate one or more parameters of the first signal;
- a prediction subsystem, configured to predict, based on the estimated one or more parameters of the first signal, one or more parameters of a B2b signal transmitted by the satellite; and
- a demodulator, configured to demodulate the B2b signal to obtain data bits of a data message modulated on the B2b signal by the satellite,
- wherein the demodulator is configured to demodulate the B2b signal based on the one or more predicted parameters of the B2b signal.

The at least one tracking loop, the prediction subsystem, and the demodulator may each be defined either in software or hardware of the GNSS receiver. In some examples, all of these components are defined in software.

The GNSS receiver may further comprise: an RF front-end, for receiving via an antenna the first signal and the B2b signal, and down converting and digitising them; a first mixer for wiping off a residual carrier from the first signal; and a second mixer for wiping off a residual carrier from the B2b signal. The GNSS receiver may further comprise a first intermediate-frequency (IF) processing unit, for processing the first signal converted from RF to IF by the RF front-end; and a second intermediate-frequency processing unit, for processing the B2b signal converted from RF to IF by the RF front-end. An output of the RF front-end may be coupled to an input of each of the intermediate-frequency processing units. An output of the first IF processing unit may be coupled to an input of the first mixer. An output of the second IF processing unit may be coupled to an input of the second mixer.

The GNSS receiver may further comprise at least a first correlator, coupled to an output of the first mixer, configured to wipe off a spreading code of the first signal. The first correlator may be part of a first correlator bank, including early, prompt, and late correlators. Similarly, the GNSS receiver may further comprise at least a second correlator, coupled to an output of the second mixer, configured to wipe off a spreading code of the B2b signal. The second correlator may be part of a second correlator bank, including early, prompt, and late correlators.

One or more outputs of the first correlator bank (including the output of the first correlator) may be coupled to the at least one tracking loop. At least one output of the second correlator bank (including the output of the second correlator) may be coupled to an input of the demodulator.

Optionally: the one or more parameters of the first signal comprise a code phase of the first signal; the one or more parameters of the B2b signal comprise a code phase of the B2b signal; and the prediction subsystem comprises an adder or a subtractor, configured to predict the code phase of the B2b signal by adding an offset to or subtracting an offset from the estimated code phase of the first signal.

The prediction subsystem may comprise a group delay difference estimator, configured to estimate a group delay difference between the first signal and the B2b signal, wherein the offset comprises or consists of the estimated group delay difference.

Optionally: the one or more parameters of the first signal comprise a frequency of the first signal; the one or more parameters of the B2b signal comprise a frequency of the B2b signal; and the prediction subsystem comprises a frequency converter, configured to predict the frequency of the B2b signal based on the estimated frequency of the first signal.

BRIEF DESCRIPTION OF THE DRAWINGS

The invention will now be described by way of example with reference to the accompanying drawings, in which.

It should be noted that these figures are diagrammatic and not drawn to scale.

DETAILED DESCRIPTION

Reference will now be made in detail to embodiments of the invention, examples of which are illustrated in the accompanying drawings. The described embodiments should not be construed as being limited to the descriptions given in this section; the embodiments may have different forms.

The inventor has recognised that it may be advantageous to demodulate a BeiDou B2b signal aided by tracking parameters for another signal transmitted by the same GNSS satellite. In effect, the other signal acts as a pilot for the B2b signal. The originally planned pilot channel for the B2b signal is now used instead for a downlink messaging service whose spreading code is not public. Therefore, no pilot signal is available for B2b tracking. This makes tracking and demodulation of the B2b (data) signal much more difficult. The B2b signal has a channel bit duration of just 2 ms. In previous solutions, since there is no pilot, reliable bit detection was required in order to track the B2b signal accurately. At the same time, reliable bit detection depended on accurate carrier tracking. Incorrect detection of bits could be interpreted by the carrier tracking loop as a Doppler shift, potentially leading to divergence of the frequency locked loop (FLL). This problem arises particularly at low carrier to noise ratios—for example, for C/No of less than 33 dBHz.

In examples according to the present disclosure, a GNSS receiver tracks a first signal transmitted in a first band by a satellite of the BeiDou GNSS. The tracking parameters for the first signal are used to aid the demodulation of the B2b signal (in a different band). In the example described below, the first signal is a B2a signal. However, it should be understood that the scope of the present disclosure is not so limited. In other examples, the first signal could instead be a signal in any one of a number of other BeiDou bands—including at least B1C, B3, or B1I.

Figure 1:
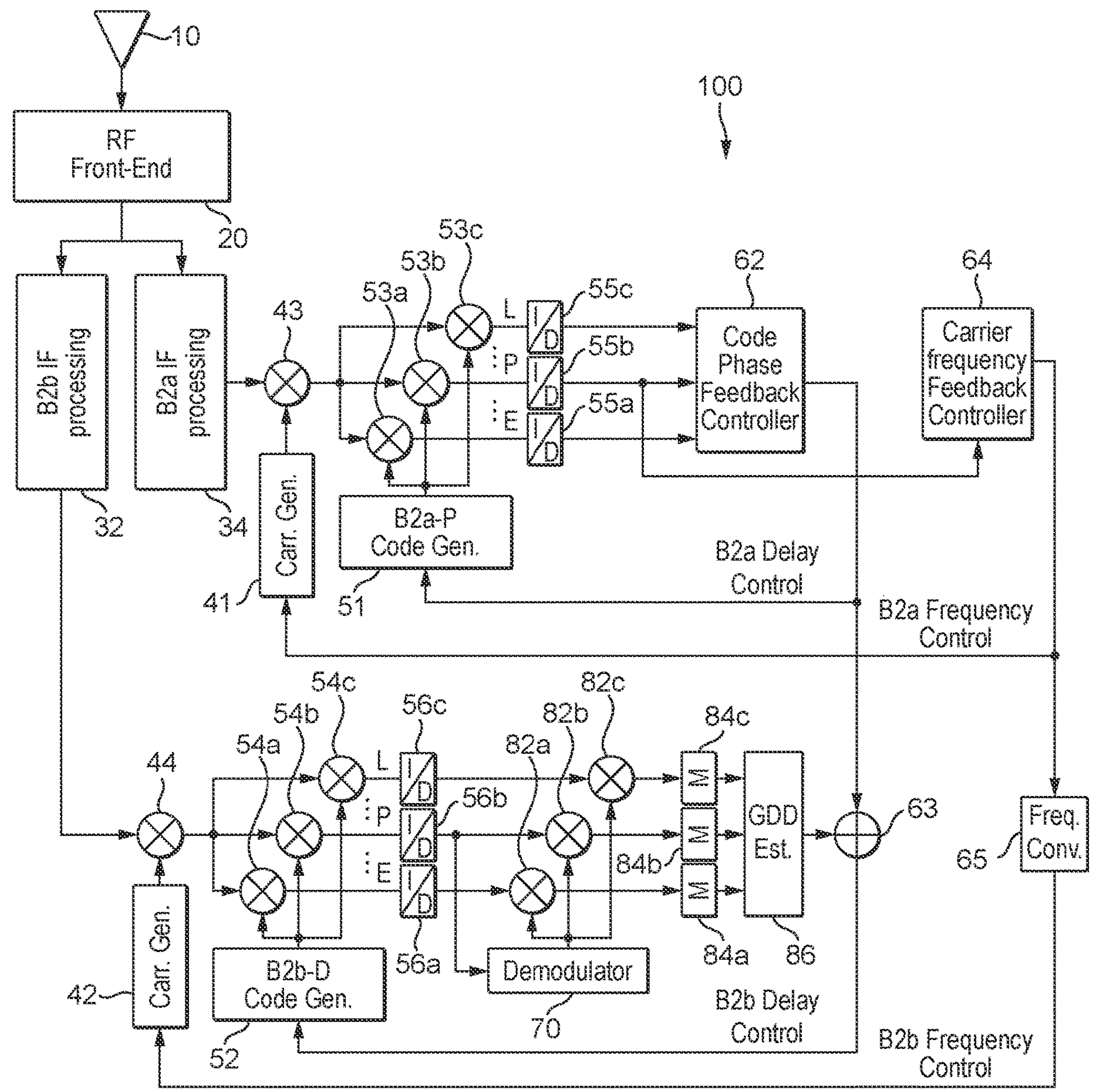
FIG. 1 is a schematic block diagram of a GNSS receiver according to an example.

FIG. 1 is a block diagram of a GNSS receiver according to an example. The GNSS receiver may be configured to receive satellite signals from a single GNSS constellation (namely, BeiDou), or it may be configured to receive satellite signals from multiple constellations (for example, Galileo and BeiDou). The GNSS receiver comprises an antenna 10 for receiving satellite signals. An RF front-end 20, coupled to the antenna 10, is configured to down-convert and digitise the satellite signals received via the antenna 10. The RF front-end essentially conditions the signals for subsequent signal processing. Other typical tasks performed by the front-end include filtering, amplification and automatic gain control.

The GNSS receiver further comprises a first intermediate frequency (IF) processing unit 34 and a second IF processing unit 32. The first IF processing unit 34 is configured to process the first signal converted from radio frequency (RF) to IF in the RF front-end. The second IF processing unit 32 is configured to process the B2b signal converted from RF to IF in the RF front-end. For the present example, the RF front-end should have a wide enough bandwidth to capture the complete B2b spectrum and at least part of the B2a spectrum. In general, the front end does not necessarily need to cover the entire B2a spectrum. It is sufficient, for present purposes, to precisely track the frequency of the B2a signal. Precise tracking in time is not essential. For frequency tracking of the B2a signal, a partial B2a spectrum is typically sufficient.

The output of the first IF processing unit 34 is coupled to an input of a first mixer 43. The other input of the first mixer 43 receives a local carrier wave, hereafter replica first carrier signal, generated to replicate the carrier frequency and phase of the incoming first signal. The replica first carrier signal is a digital sinusoidal signal, generated by a first carrier generator 41. In this way, the first mixer 43 is configured to wipe off, i.e. remove any residual carrier, e.g. offset caused by the Doppler effect, from the incoming signal, by mixing the incoming B2a signal with the replica first carrier signal. Although the carrier of the satellite signal is already removed before the incoming signal reaches the first mixer 43, there will be a carrier offset caused by the relative motion between the satellite and GNSS receiver. The first carrier generator 41 comprises a numerically controlled oscillator (NCO), configured to generate the replica first carrier signal.

The output of the first mixer 43 is provided as input to a first bank of correlators, comprising three correlators. Each correlator consists of a multiplier 53*a-c*, whose output is provided as input to a respective integrate-and-dump (I/D) unit 55*a-c*. The multiplier multiplies the input signal by a replica first spreading code (a replica of the spreading code used by the satellite when transmitting the first signal). The I/D unit calculates the sum of the resulting product values, over a suitable dwell. The dwell defines the length of the coherent integration. The first bank of correlators includes: an “early” (E) correlator (comprising multiplier 53*a* and I/D unit 55*a*); a "prompt" (P) correlator (comprising multiplier 53*b* and I/D unit 55*b*); and a "late" (L) correlator (comprising multiplier 53*c* and I/D unit 55*c*). As their names suggest, these three correlators use differently shifted versions of the replica first spreading code. The replica first spreading code is a binary pseudo-random noise (PRN) signal, and is generated by a first code generator 51, which operates under the control of a code phase feedback controller 62. The code phase feedback controller 62 receives the outputs of the three correlators. Depending on which of the three correlators (E, P, L) has the maximum output, the controller 62 determines whether to adjust (for example, increment or decrement) the code phase delay control signal for the first signal, which it provides to the first code generator 51.

In this way, the first bank of correlators, together with the code phase feedback controller 62 and the first code generator 51, function as a code phase tracking loop—in other words, a delay locked loop (DLL)—for the B2a signal. The code phase tracking loop ensures that the code phase of the replica first spreading code used by the "P" correlator tracks the actual code phase of the received B2a signal with as little delay as possible. The output of the prompt (P) correlator is also provided as input to a carrier frequency feedback controller 64. The carrier frequency feedback controller 64 is configured to track the carrier frequency and phase of the B2a signal. It provides feedback to the first carrier generator 41 in the form of a frequency control signal. This configuration of components implements a carrier tracking loop for the B2a signal. By controlling the frequency of the NCO in the first carrier generator 41, both the frequency and phase of the replica first carrier signal are controlled to match the frequency and phase of the residual carrier. (The phase of the replica first carrier signal is advanced by increasing the frequency; the phase is retarded by decreasing the frequency.) Effectively, this implements a phase locked loop (PLL), tracking the residual carrier frequency and phase.

The label ("P") of the prompt correlator should not be confused with the label "B2a-P" in FIG. 1 for the first code generator 51. The latter label reflects the fact that, in the present example, the code phase tracking loop is tracking the B2a pilot signal.

The outputs of the I/D units 55*a-c* consist of complex-valued samples, also referred to as in-phase and quadrature samples (I/Q samples). In particular, the output of the I/D unit 55*b*, for the prompt (P) correlator, represents I/Q samples of the B2a signal. It should be understood that, although each correlator in the bank of correlators is shown as comprising a single multiplier 53 and a single I/D unit 55*a-c*, when implemented in hardware the correlator, as with other hardware blocks, will include separate I- and Q-branches. That is, there will be a multiplier and an I/D unit for the in-phase (I) samples, and another multiplier and I/D unit for the quadrature-phase (Q) samples. Nevertheless, for simplicity, it is more convenient to illustrate these as a single multiplier and a single I/D unit, having complex outputs, and that is how they will be described here.

The receive chain for the B2b signal includes many components that are similar to their counterparts in the receive-chain for the first signal (that is, the B2a signal, in this example). The output of the second IF processing unit 32 is coupled to an input of a second mixer 44. The other input of the second mixer 44 receives a local carrier wave, hereafter B2b replica carrier signal, generated to replicate the carrier frequency of the incoming B2b signal. The B2b replica carrier signal is a digital sinusoidal signal, generated by a second carrier generator 42. The second mixer 44 is configured to wipe off, i.e. remove any residual carrier, e.g. offset caused by the Doppler effect, from the incoming signal, by mixing the incoming B2b signal with the B2b replica carrier signal. The second carrier generator 42 comprises an NCO, configured to generate the B2b replica carrier signal.

The output of the second mixer 44 is provided as input to a second bank of correlators, comprising three correlators. Once again, each correlator consists of a multiplier 54*a-c* and a respective I/D unit 56*a-c* (which are treated as having complex-valued outputs, in the same manner as described above for the multipliers 53*a-c* and I/D units 55*a-c*). Each multiplier multiplies the signal that was output from the second mixer 44 with a replica B2b spreading code. Once again, the second bank of correlators includes early (E), prompt (P), and late (L) correlators, which use differently shifted versions of the replica B2b spreading code. The replica B2b spreading code (again, a binary PRN signal) is generated by a second code generator 52. The second code generator 52 is labelled "B2b-D" in FIG. 1, which reflects the fact that the B2b data signal is being tracked. (As mentioned above, the spreading code of the B2b pilot signal is not public.) The delay feedback control for the second code generator 52 will be described below.

The outputs of the second bank of correlators are provided as inputs to a further bank of multipliers 82*a-c*, with each correlator output being provided as input to a respective one of the multipliers 82*a-c*. The output of the prompt (P) correlator is also provided as input to a demodulator 70. The demodulator 70 performs bit detection on this correlator output, to demodulate the B2b signal and thereby obtain the data bits of the data message modulated on the signal by the satellite. The demodulator 70 in this example performs differential bit-detection—comparing the carrier phase between successive bit-periods in order to determine the data bits. The use of differential bit detection means that it is not necessary to coherently track the phase of the B2a residual carrier. Provided that the frequency tracking is sufficiently accurate (for example, tracking to within 1 KHz of the actual Doppler shift), the phase in the current bit period will rotate at approximately the same rate as the phase in the preceding (reference) bit period. Therefore, the phase difference between them will produce a reliable decision variable for bit detection.

Each of the multipliers 82*a-c* is configured to wipe off the detected data bits from its respective input. To do this, the demodulator 70 provides the multipliers with the currently detected bit (represented as +1 or −1). Each multiplier 82*a-c* multiplies this currently detected bit by the signal at its other input (which is the output signal from one of the correlators of the second bank). Note that a delay element (not shown) may be provided in the path from each I/D unit 56*a-c* to the respective multiplier 82*a-c*, to ensure that the detected bits are correctly aligned with the I/Q samples when they reach each multiplier. After the multipliers 82*a-c* wipe off the bits, the output signal of each multiplier is fed to a respective integration unit 84*a-c*. Each integration unit integrates (sums) the signal samples over a predetermined dwell. In this example, the predetermined dwell corresponds to the combined bit-duration of a plurality of bits wiped off by the multipliers 82*a-c*. This permits a longer coherent integration than merely integrating over one bit-duration. The outputs of the integration units 84*a-c* are provided as inputs to a group delay difference (GDD) estimator 86.

The purpose of the GDD estimator 86 is to provide the delay feedback control for the second code generator 52. It is configured to estimate a group delay difference between the first signal (which in this example is the B2a signal) and the B2b signal. It provides an output which is summed, by an adder 63, with the output of the code phase feedback controller 62. The output of the adder 63 is provided as the input to the second code generator 52. In this way, the code phase of the replica B2b spreading code is controlled by the sum of the code phase delay control signal for the first signal (which is produced by the code phase feedback controller 62 in the code phase tracking loop for the first signal) and the GDD estimate. It is expected that the code phase delay control signal for the first signal will track the first signal (the B2a signal, in this example) accurately, accounting for changes in code phase caused by both (a) the dynamics of the receiver and the satellite and (b) external factors, such as varying ionospheric delay. The dynamics are the same for both the first signal and the B2b signal, since both signals are transmitted by the same satellite and received by the same receiver. Therefore, the GDD estimator 86 needs only to adjust for external factors. In particular, it compensates for changes in the group delay difference between the two signals over time, caused by changes in factors such as the ionospheric delay at the different frequencies of the two bands.

The GDD estimator 86 essentially performs a similar set of operations to the code phase feedback controller 62. It compares the outputs of the integration units 84*a-c* and identifies the output with the maximum value. If the maximum is not seen on the output corresponding to the prompt (P) correlator, then the GDD estimator 86 increments or decrements its output value, depending on whether the maximum corresponds to the late (L) or early (E) correlator.

As mentioned above, the output of the GDD estimator 86 is summed with the code phase delay control signal for the first signal, and the resulting sum value is fed back to control the second code generator 52. Consequently, over time, the output of the GDD estimator will track the difference between the code phase of the first signal and the code phase of the B2b signal. The output of the adder 63 will track the code phase of the B2b signal.

One difference between the code phase feedback controller 62 and the GDD estimator 86 is that the GDD estimator 86 uses a smaller loop gain. This means that it modifies the estimated group delay difference (which it outputs) in smaller increments than those used by the code phase feedback controller 62 to adjust the code phase delay control signal for the first signal. The use of smaller increments (that is, a smaller loop gain) ensures that the GDD estimator 86 only tracks slowly varying changes in the group delay difference—in particular, those caused by changes in the ionosphere rather than those associated with the dynamics of the receiver and the satellite.

In this way, the tracking loop for controlling the code phase of the replica B2b spreading code in one sense operates as a branch of the code phase tracking loop for the first signal. This branch is influenced by the code phase delay control signal for the first signal (output by the code phase feedback controller 62), and therefore tracks the same variations that are tracked by the delay control for the first signal. However, in the present example, it also tracks any drift in the code phase relationship (in other words, the delay relationship) between the first signal and the B2b signal.

While the code phase of the B2b signal is tracked by the "inner" loop in FIG. 1 (comprising the code phase feedback controller 62, the GDD estimator 86, and the adder 63), the carrier frequency of the B2b signal is tracked by an "outer" loop in the drawing. As already explained above, the carrier frequency feedback controller 64 tracks the frequency and phase of the first signal (the B2a signal, in the present example). The frequency control signal that is output by this controller is provided to the first carrier generator 41. It is also provided to a frequency converter 65, which converts it to a second frequency control signal for the B2b signal. This second frequency control signal controls the second carrier generator 42.

Changes in the frequency of the first signal (for example, caused by varying Doppler frequency) are related directly to changes in the frequency of the B2b signal, by a fixed ratio. This is because both signals are transmitted by the same satellite and received by the same receiver. Consequently, the relative velocity between the satellite and receiver is the same for both signals. This relative velocity has an effect on each signal that is proportional to the frequency of the signal. To convert the frequency control signal for the first signal to a frequency control signal for the B2b signal, the frequency converter 65 simply scales it by the fixed ratio. If $F_1$ denotes the nominal carrier frequency of the first signal, and $F_2$ denotes the nominal carrier frequency of the B2b signal, then the fixed ratio applied by the frequency converter 65 is:

$$\frac{F_2}{F_1}$$

In other words, if $f_1$ is the frequency control signal for the first signal, and $f_2$ is the frequency control signal for the B2b signal, the frequency converter 65 performs the calculation:

$$f_2 = \left(\frac{F_2}{F_1}\right) f_1$$

In this way, there is no need for a separate tracking loop to track the frequency of the B2b signal. (Furthermore, in the present example, using differential bit detection, there is no need to track the carrier phase of the B2b signal at all.) The second carrier generator 42 is controlled indirectly but solely by the frequency control signal for the first signal, produced in the carrier tracking loop for the first signal.

The components shown in the block diagram of FIG. 1 may be implemented in hardware or software, or a mixture of both. According to the present implementation, the blocks 62, 63, 64, 65, 70, 82*a-c*, 84*a-c* and 86 are implemented in software running on a processor of the GNSS receiver. In other words, they are defined functionally in computer program code to be executed by the (programmable) processor. The processor may be a general purpose microprocessor, a digital signal processor (DSP), or other suitable processor. The blocks upstream in the receive chain—namely, blocks 20, 32, 34, 41, 42, 43, 44, 51, 52, 53*a-c*, 54*a-c*, 55*a-c*, and 56*a-c*, as well as antenna 10—are implemented in hardware in the current implementation.

Figure 2:
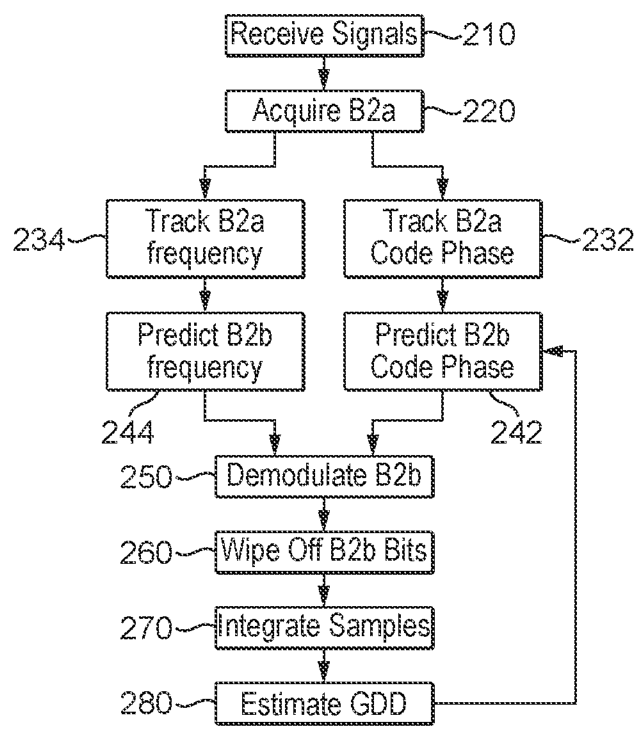
FIG. 2 is a flowchart illustrating a method performed by the GNSS receiver of FIG. 1 according to an example.

FIG. 2 is a flowchart illustrating a method performed by the GNSS receiver 100 of FIG. 1. In step 210, the receiver 100 receives the signals of a given BeiDou satellite. (In practice, the receiver may receive the signals of all of the BeiDou satellites in the same step; however, for now, the purpose of explanation, we are interested in the signals of a single satellite.) As explained already above, the signals are received via the antenna 10 by the RF front-end 20.

In step 220, the receiver acquires the B2a signal, and achieves pilot sync. Methods for GNSS signal acquisition are well-known in the art and will not be described further here, since they are outside the scope of the present disclosure. Having acquired the B2a signal, the receiver now begins tracking it. Tracking the B2a signal involves estimating parameters of the B2a signal. In particular, according to the present method, the code phase of the B2a signal is tracked continuously (see step 232) and the carrier frequency (and phase) of the B2a signal is tracked continuously (see step 234). As already explained above, the code phase feedback controller 62 is responsible for tracking the code phase, while the carrier frequency feedback controller 64 is responsible for tracking the carrier frequency (and phase).

In step 242, the receiver predicts the code phase of the B2b signal based on the code phase of the B2a signal, estimated in step 232. This involves adding an offset to the estimated code phase of the B2a signal (or, equivalently, subtracting an offset from it). According to the present example, the offset is an estimated group delay difference between the two signals. As explained above, this adding step is performed by the adder 63, in the context of FIG. 1.

In step 244, the receiver predicts the frequency of the B2b signal based on the estimated frequency of the B2a signal. This involves scaling the estimated frequency of the first signal by a scale factor that depends on the nominal centre frequencies of the two signal-bands. As explained above, this conversion is carried out by the frequency converter 65.

In step 250, the demodulator 70 demodulates the B2b signal to obtain data bits of a data message modulated on that signal by the satellite. This demodulation is based on the predicted parameters (code phase and frequency) of the B2b signal, in that the predicted parameters are used to drive the second carrier generator 42 and the second code generator 52. The second carrier generator 42 and the second code generator 52 control the mixing operation performed by the second mixer 44 and the operation of the second bank of correlators, respectively. Therefore, the predicted parameters influence the signal processing prior to the bit-detection performed by the demodulator 70. A group of bits is detected in a given dwell. In the present example, the dwell is 10 ms. The B2b signal has a data rate of 1000 bps; therefore, 10 bits are detected in a dwell. The bits are detected one by one, sequentially.

In step 260, the receiver wipes off, from the correlator outputs, the detected B2b bits obtained in step 250. As explained above, this is done by the multipliers 82*a-c*. In step 270, the integration units 84*a-c* integrate the samples output by the respective multipliers 82*a-c*. The integration is over all samples in the dwell. This is possible because the bits have been wiped off from this dwell. In other words, wiping off the bits permits a longer coherent integration time to be used in step 270. This longer integration can improve the accuracy of the GDD estimate. In step 280, the GDD estimator 86 estimates (updates) the current group delay difference between the B2a signal and the B2b signal. As mentioned already, the estimated group delay difference produced in step 280 is added to the code phase estimated for the B2a signal in step 232, in order to predict the code phase of the B2b signal (see step 242).

The process illustrated in FIG. 2 is repeated for the signals received from each visible BeiDou satellite. In this way, the B2b signals of all of the in-view satellites of the BeiDou constellation can be demodulated, aided by the B2a signals of the respective satellites.

Here, we take the opportunity to emphasise once again that the method is not limited to demodulation aided by the tracking parameters of the B2a signal. Any suitable first signal (not only the B2a signal) transmitted by a BeiDou satellite may be used to aid the demodulation of that satellite's B2b signal. When demodulating the B2b signals of multiple BeiDou satellites, the first signal aiding the demodulation may be the same in each case, or different in at least some cases. For example, B2a signals may be used as the first signals for all of the satellites. In another case—purely by way of example—a B3 signal may be used to provide demodulation-aiding, for one satellite, and a B1C signal may be used to provide demodulation-aiding, for another satellite.

It should be understood that the scope of the present disclosure is also not limited to the examples above in other respects. For instance, although the GDD estimator 86 provides one advantageous way to predict the B2b code phase by adding an offset to the B2a code phase, it is not the only possibility. Other examples may eliminate the GDD estimator (and the multipliers 82*a-c* and integration units 84*a-c* that provide the inputs to it). Instead, it might be assumed, as an approximation, that the code phase offset (delay) between the two signals is constant over time and does not need to be tracked. In this case, a constant fixed offset would be added to the code phase of the B2a signal, by the adder 63.

Other variations involve the way that the blocks are implemented. In the example discussed above, certain components were defined in software or software modules running on a processor of the GNSS receiver. However, in other examples, some or all of these units may be implemented in dedicated, fixed-function hardware. Likewise, components that were defined in hardware, according to the example above, may be defined in software, in other embodiments.

In the claims, any reference signs placed between parentheses shall not be construed as limiting the claim. The word "comprising" does not exclude the presence of elements or steps other than those listed in a claim. However, where the word "comprising" is used, this also discloses as a special case the possibility that the elements or steps listed are exhaustive—that is, the apparatus or method may consist solely of those elements or steps. The word "a" or "an" preceding an element does not exclude the presence of a plurality of such elements. The embodiments may be implemented by means of hardware comprising several distinct elements. In a device claim enumerating several means, several of these means may be embodied by one and the same item of hardware. The mere fact that certain measures are recited in mutually different dependent claims does not indicate that a combination of these measures cannot be used to advantage. Furthermore, in the appended claims lists comprising "at least one of: A; B; and C" should be interpreted as (A and/or B) and/or C.

In flowcharts, summaries, claims, and descriptions relating to methods, the sequence in which steps are listed is not, in general, intended to be limiting on the order in which they are carried out. The steps may be performed in a different order to that indicated (except where specifically indicated, or where a subsequent step relies on the product of a preceding step). Nevertheless, the order in which the steps are described may in some cases reflect a preferred sequence of operations.

Furthermore, in general, the various embodiments may be implemented in hardware or special purpose circuits, software, logic or any combination thereof. For example, some aspects may be implemented in hardware, while other aspects may be implemented in firmware or software, which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments as discussed herein may be practiced in various components such as integrated circuit modules. The design of integrated circuits is generally a highly automated process. Complex and powerful software tools are available for converting a logic level design into a semiconductor circuit design ready to be etched and formed on a semiconductor substrate.

The invention claimed is:

1. A method for demodulating a B2b signal from a satellite in the BeiDou Global Navigation Satellite System (GNSS), the method comprising:

tracking a first signal transmitted in a first GNSS operational band by the satellite, to estimate one or more parameters of the first signal;

predicting, based on the estimated one or more parameters of the first signal, one or more parameters of the B2b signal transmitted by the satellite;

demodulating the B2b signal to obtain data bits of a data message modulated on the B2b signal by the satellite, wherein the demodulating is based on the one or more predicted parameters of the B2b signal, wherein the one or more parameters of the first signal comprise a code phase of the first signal, and the one or more parameters of the B2b signal comprise a code phase of the B2b signal, wherein predicting the code phase of the B2b signal comprises adding or subtracting an offset to or from an estimated code phase of the first signal; and estimating a group delay difference between the first signal and the B2b signal, wherein the offset comprises or consists of the estimated group delay difference.

2. The method of claim 1, further comprising, before estimating the group delay difference:

wiping off the obtained data bits from the B2b signal; and after wiping off the data bits, integrating samples of the B2b signal over a predetermined dwell, wherein the group delay difference is estimated based on a result of the integrating.

3. The method of claim 1, wherein:

the one or more parameters of the first signal comprise a frequency of the first signal;

the one or more parameters of the B2b signal comprise a frequency of the B2b signal; and the method comprises predicting, based on an estimated frequency of the first signal, the frequency of the B2b signal.

4. The method of claim 3, wherein predicting the frequency of the B2b signal comprises scaling the estimated frequency of the first signal by a predetermined scale factor.

5. The method of claim 1 wherein the first GNSS operational band is one of: BeiDou B2a band; BeiDou B3 band; BeiDou BIC band; or BeiDou B1I band.

6. The method of claim 1, further comprising:

tracking a second signal transmitted in a second GNSS operational band by a second satellite, to estimate one or more parameters of the second signal;

predicting, based on the estimated one or more parameters of the second signal, one or more parameters of a B2b signal transmitted by the second satellite; and demodulating the B2b signal to obtain data bits of a data message modulated on the B2b signal by the second satellite, wherein the demodulating is based on the one or more predicted parameters of the B2b signal.

7. One or more tangible, non-transitory, computer-readable media storing instructions that, when executed by one or more machines, cause the one or more machines to perform operations comprising:

track a first signal transmitted in a first BeiDou Global Navigation Satellite System (GNSS) operational band by a satellite, to estimate one or more parameters of the first signal;

predict, based on the estimated one or more parameters of the first signal, one or more parameters of a B2b signal transmitted by the satellite;

demodulate the B2b signal to obtain data bits of a data message modulated on the B2b signal by the satellite, wherein the demodulating is based on the one or more predicted parameters of the B2b signal, wherein the one or more parameters of the first signal comprise a code phase of the first signal, and the one or more parameters of the B2b signal comprise a code phase of the B2b signal;

wherein predicting the code phase of the B2b signal comprises adding or subtracting an offset to or from an estimated code phase of the first signal; and estimating a group delay difference between the first signal and the B2b signal, wherein the offset comprises or consists of the estimated group delay difference.

8. A Global Navigation Satellite System (GNSS) receiver comprising:

at least one tracking loop, configured to track a first signal transmitted in a first GNSS operational band by a satellite in the BeiDou GNSS, to estimate one or more parameters of the first signal;

a prediction subsystem, configured to predict, based on the estimated one or more parameters of the first signal, one or more parameters of a B2b signal transmitted by the satellite; and a demodulator, configured to demodulate the B2b signal to obtain data bits of a data message modulated on the B2b signal by the satellite, wherein the demodulator is configured to demodulate the B2b signal based on the one or more predicted parameters of the B2b signal, wherein the one or more parameters of the first signal comprise a code phase of the first signal, and the one or more parameters of the B2b signal comprise a code phase of the B2b signal;

wherein the prediction subsystem comprises an adder or a subtractor configured to predict the code phase of the B2b signal by adding or subtracting an offset to or from an estimated code phase of the first signal, and wherein the prediction subsystem comprises a group delay difference estimator configured to estimate a group delay difference between the first signal and the B2b signal, wherein the offset comprises or consists of the estimated group delay difference.

9. The GNSS receiver of claim 8, wherein:

the one or more parameters of the first signal comprise a frequency of the first signal;

the one or more parameters of the B2b signal comprise a frequency of the B2b signal; and the prediction subsystem comprises a frequency converter, configured to predict the frequency of the B2b signal based on an estimated frequency of the first signal.

* * * * *